US012593160B2

(12) United States Patent
Saito

(10) Patent No.: US 12,593,160 B2
(45) Date of Patent: Mar. 31, 2026

(54) EARPIECE WITH STABILIZER

(71) Applicant: GOERTEK INC., Weifang (CN)

(72) Inventor: Katsumi Saito, Weifang (CN)

(73) Assignee: GOERTEK INC., Weifang (CN)

( * ) Notice: Subject to any disclaimer, the term of this patent is extended or adjusted under 35 U.S.C. 154(b) by 329 days.

(21) Appl. No.: 18/003,924

(22) PCT Filed: Dec. 4, 2020

(86) PCT No.: PCT/CN2020/133752
§ 371 (c)(1),
(2) Date: Dec. 30, 2022

(87) PCT Pub. No.: WO2022/116123
PCT Pub. Date: Jun. 9, 2022

(65) Prior Publication Data

US 2024/0031722 A1 Jan. 25, 2024

(51) Int. Cl.
*H04R 1/10* (2006.01)

(52) U.S. Cl.
CPC ........... *H04R 1/105* (2013.01); *H04R 1/1016* (2013.01); *H04R 1/1075* (2013.01)

(58) Field of Classification Search
CPC ..... H04R 1/105; H04R 1/1016; H04R 1/1075
USPC .......................................................... 381/328
See application file for complete search history.

(56) References Cited

U.S. PATENT DOCUMENTS

| | | | |
|---|---|---|---|
| 5,953,435 A | 9/1999 | Mullin et al. | |
| 7,050,598 B1 | 5/2006 | Ham | |
| 8,374,367 B2 * | 2/2013 | Nielsen | H04R 25/652 381/328 |
| 8,929,582 B2 * | 1/2015 | Silvestri | H04R 1/1058 381/370 |
| 11,583,215 B2 * | 2/2023 | Andersen | A61B 5/256 |
| 2007/0280496 A1 * | 12/2007 | Karamuk | H04R 25/656 381/328 |

FOREIGN PATENT DOCUMENTS

| | | |
|---|---|---|
| CN | 101316452 A | 12/2008 |
| CN | 103596099 A | 2/2014 |
| CN | 206100453 U | 4/2017 |
| CN | 209593689 U | 11/2019 |
| EP | 2645736 A1 | 10/2013 |

OTHER PUBLICATIONS

International Search Report from International Application No. PCT/CN2020/133752 mailed Aug. 13, 2021.

* cited by examiner

*Primary Examiner* — Suhan Ni
(74) *Attorney, Agent, or Firm* — Shih IP Law Group, PLLC.

(57) ABSTRACT

A device for transmitting sound to an ear canal includes a body portion, and a stabilizer element extending from the body portion. The stabilizer element is bendable in both a clockwise direction and a counterclockwise direction with respect to a central axis of a sound passage formed in the body portion, so as to contact with a cymba concha area of an ear to stabilize the device to the ear. In this way, an earpiece including the device may be worn on both a left ear and a right ear of a human, thereby reducing manufacture cost and complexity and improving user experience.

14 Claims, 8 Drawing Sheets

EARPIECE WITH STABILIZER

FIELD

The present disclosure relates to the technical field of electronics, and in particular to an earpiece that is compatible with both left ear and right ear of a human.

BACKGROUND

Multiple kinds of earpieces have emerged in the market, some of which are equipped with stabilizers to fix the earpieces to human ears. In general, an earpiece for left ear is mirror-symmetric with one for right ear, which means that a stabilizer of an earpiece for left ear is not compatible with right ear and the earpiece for left ear therefore cannot be worn thereon, vice versa. Such non-compatibility, on one hand, increases manufacture cost and complexity, and on the other hand, results in difficulty and confusion for a user when the user wears an earpiece as she/he has to identify whether the earpiece is for right ear or left ear before wearing it.

SUMMARY

In view of the above, an objective of the present disclosure is to address the problem in related art as mentioned above by the following technical solutions.

In an aspect, a device for transmitting sound to an ear canal is provided according to some embodiments of the present disclosure. The device includes:

- a body portion, the body portion having a first surface for contact with a cavum concha area of an ear and a second surface for coupling with a sound generator, where a sound passage connecting the first surface and the second surface is formed in the body portion;
- a stabilizer element extending from the body portion, the stabilizer element being bendable in both a clockwise direction and a counterclockwise direction with respect to a central axis of the sound passage for contact with a cymba concha area of the ear to stabilize the device to the ear.

In some embodiments based on some of the above embodiments, the stabilizer element may be symmetric about a major axis of the device, the major axis extending to cross the central axis of the sound passage.

In some embodiments based on some of the above embodiments, an aperture may be formed in the stabilizer element.

In some embodiments based on some of the above embodiments, the aperture may be symmetric about the major axis.

In some embodiments based on some of the above embodiments, the aperture may be parallelogram-shaped or kite-shaped.

In some embodiments based on some of the above embodiments, the aperture may be semielliptical.

In some embodiments based on some of the above embodiments, the stabilizer element may be a semielliptical loop.

In some embodiments based on some of the above embodiments, both a first side surface and a second side surface of the stabilizer element may have a recess and a width of the recess may gradually decrease along a direction from the first side surface or the second side surface to a central axis of the stabilizer element, where the first side surface and the second side surface are for contact with the cymba concha area of the ear when the stabilizer element is bent along the clockwise direction and the counterclockwise direction, respectively.

In some embodiments based on some of the above embodiments, both a first side surface and a second side surface of the stabilizer element may have a recess and a width of the recess may gradually decrease along a direction from the first side surface or the second side surface to the major axis of the device, where the first side surface and the second side surface are for contact with the cymba concha area of the ear when the stabilizer element is bent along the clockwise direction and the counterclockwise direction, respectively.

In some embodiments based on some of the above embodiments, a cross section of the recess may be triangular or semielliptical.

In some embodiments based on some of the above embodiments, the stabilizer element may be made of a soft material.

In some embodiments based on some of the above embodiments, the soft material may be selected from a group including elastomer, epoxy, urethane and silicone.

In some embodiments based on some of the above embodiments, the stabilizer element may include a top portion made of a first material and a bottom portion made of a second material and the top portion is coupled with the body portion by the bottom portion.

In some embodiments based on some of the above embodiments, a hardness of the second material may be different from a hardness of the first material.

In an aspect of the present disclosure, an earpiece is provided according to some embodiments of the present disclosure. The earpiece includes:

- the device for transmitting sound to an ear canal according to any one of the above embodiments; and
- a sound generator, coupled with the body portion at the second surface and configured to generate sound and transmit the sound to the ear canal through the sound passage.

In the device for transmitting sound to an ear canal and the earpiece according to the embodiments of the present disclosure, the stabilizer element is bendable in both a clockwise direction and a counterclockwise direction with respect to the central axis of the sound passage, so that the body portion can fit in a cavum concha area when the earpiece is worn on any of the left ear and right ear of a human. That is, earpieces for left ear and right ear can be formed to have the same configuration. In this way, the manufacture cost and complexity can be reduced, and a user does not have to identify whether an earpiece is for left ear or right ear before wearing it, thereby reducing difficulty and confusion and improving user experience for the user.

BRIEF DESCRIPTION OF THE DRAWINGS

For clearer illustration of the technical solutions according to embodiments of the present disclosure or related art, hereinafter are briefly described the drawings to be applied in embodiments of the present disclosure or conventional techniques. Same legends in different drawings designate the same components among the drawings.

Figure 3A:
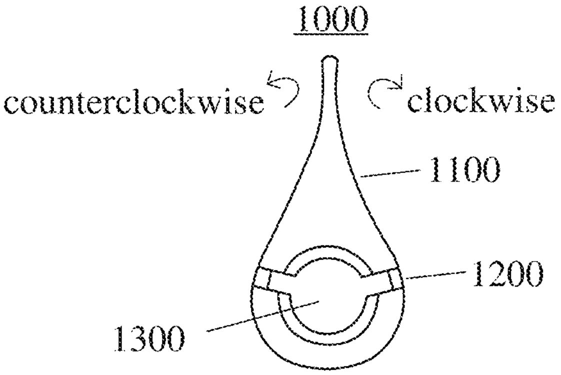
Figure 3B:
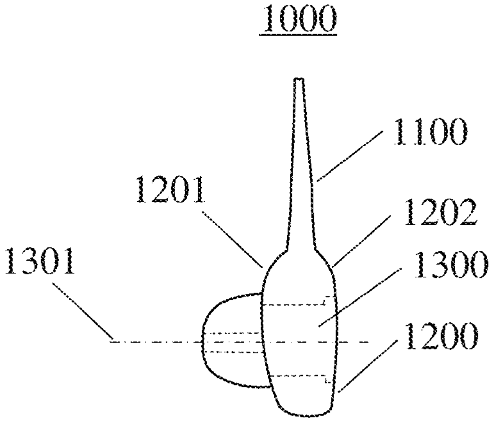

FIG. **3*a*** is a schematic front view of a device for transmitting sound to an ear canal according to an embodiment of the present disclosure;

FIG. 3*b* is a schematic side view of the device in FIG. 3*a;*

Figure 4:
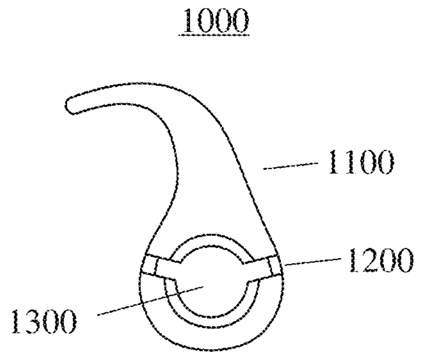
Figure 5:
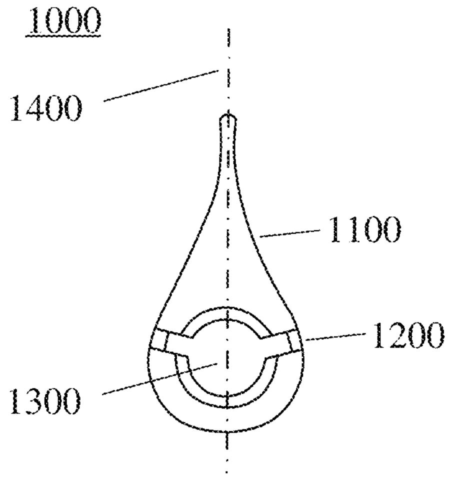
Figure 6A:
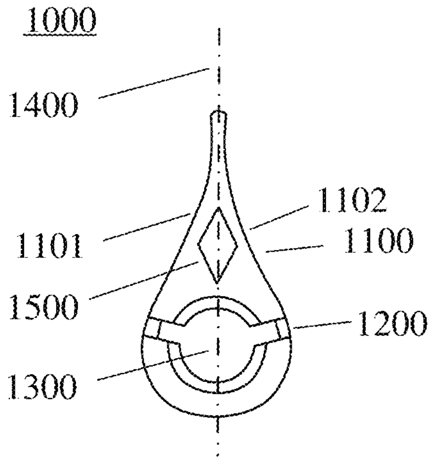
Figure 6B:
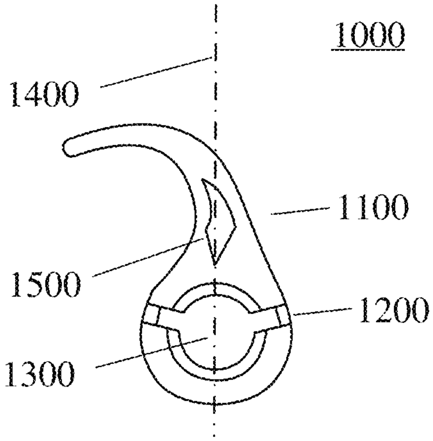
Figure 7:
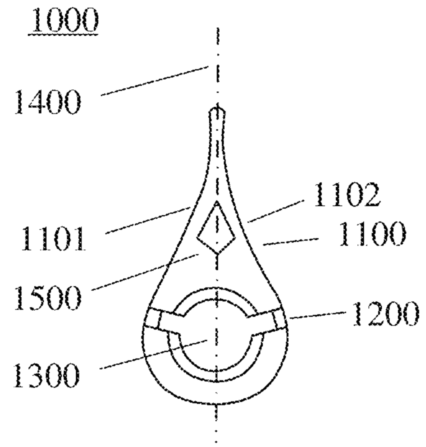
Figure 8A:
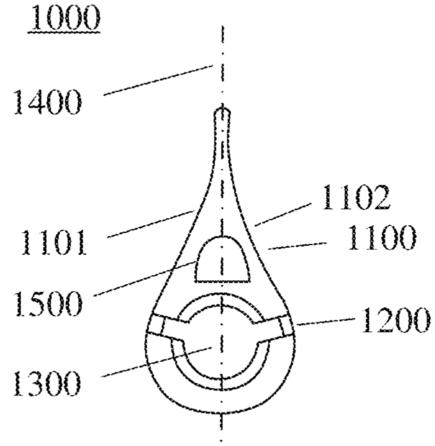
Figure 8B:
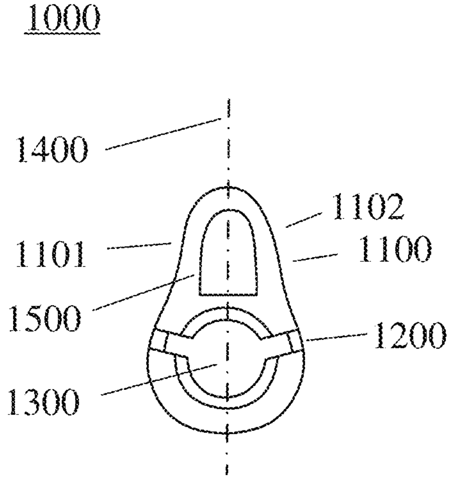
Figure 9A:
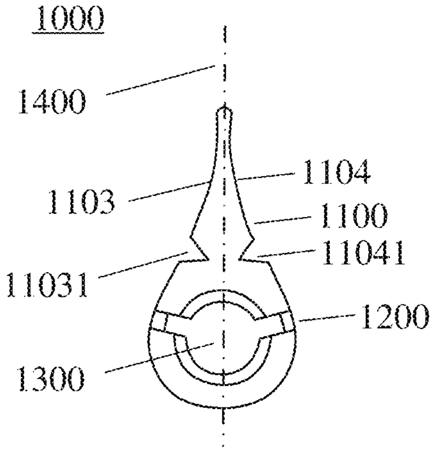
Figure 9B:
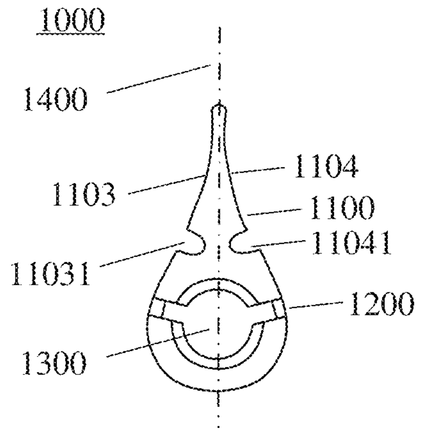
Figure 10:
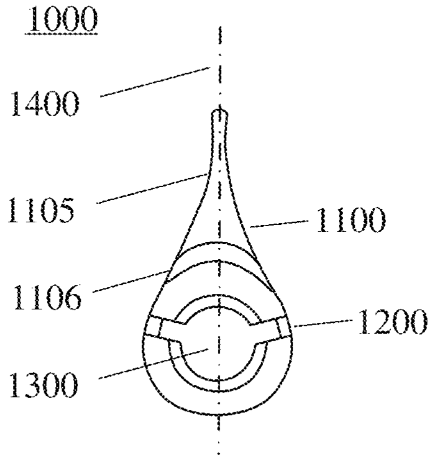
Figure 11:
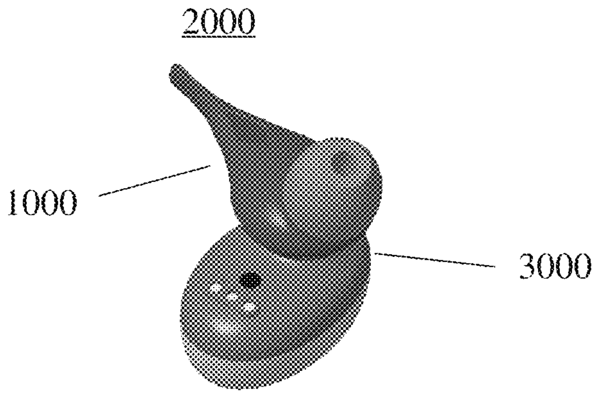

FIG. 4 is a schematic diagram of the device in FIG. 3*a* in a bent state according to an embodiment of the present disclosure;

FIG. 5 is a schematic front view of a device for transmitting sound to an ear canal according to an embodiment of the present disclosure;

FIG. 6*a* is a schematic front view of a device for transmitting sound to an ear canal according to an embodiment of the present disclosure;

FIG. 6*b* is a schematic front view of the device in FIG. 6*a* in a bent state according to an embodiment of the present disclosure;

FIG. 7 is a schematic front view of a device for transmitting sound to an ear canal according to an embodiment of the present disclosure;

FIG. 8*a* is a schematic front view of a device for transmitting sound to an ear canal according to an embodiment of the present disclosure;

FIG. 8*b* is a schematic front view of a device for transmitting sound to an ear canal according to an embodiment of the present disclosure;

FIG. 9*a* is a schematic front view of a device for transmitting sound to an ear canal according to an embodiment of the present disclosure;

FIG. 9*b* is a schematic front view of a device for transmitting sound to an ear canal according to an embodiment of the present disclosure;

FIG. 10 is a schematic front view of a device for transmitting sound to an ear canal according to an embodiment of the present disclosure; and FIG. 11 is a schematic diagram of an earpiece according to an embodiment of the present disclosure.

DETAILED DESCRIPTION OF EMBODIMENTS

The technical solution of the present disclosure is hereinafter described in detail with reference to the accompanying drawings. It is evident that the embodiments are only some exemplary embodiments of the present disclosure, and the present disclosure is not limited to such embodiments. Other embodiments that those skilled in the art obtain based on embodiments of the present disclosure also all within the protection scope of the present disclosure.

Figure 1:
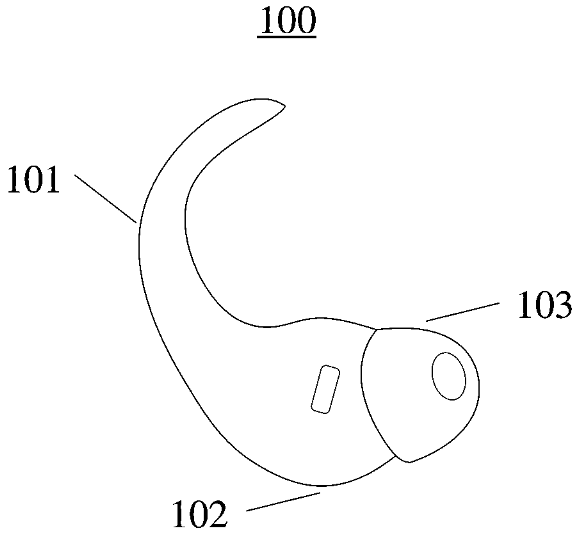
FIG. 1 is a schematic diagram of a stabilizer of an earpiece in related art.
Figure 2:
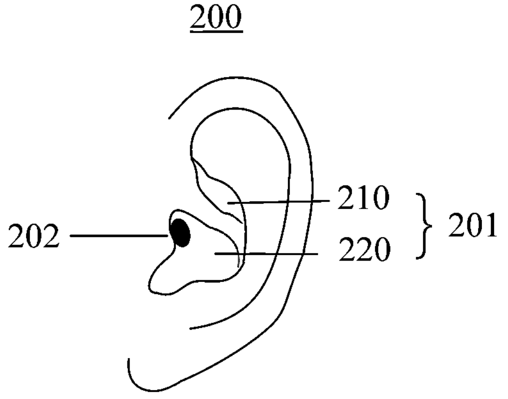
FIG. 2 is a schematic diagram of a human ear.

FIG. 1 shows a schematic diagram of a stabilizer of an earpiece in related art, and FIG. 2 shows a schematic diagram of an auricle of a human ear, where reference will always be made to FIG. 2 in the following description of earpieces in related art and according to the present disclosure. As can be seen from FIG. 1 and with reference to FIG. 2, the illustrated stabilizer 100 includes a tail portion 101 that is bent in order to fit in a cymba concha area 210 (also referred to as "upper concha") of a human ear 200, a body portion 102 in which a passage for sound transmission is formed, and a tip portion 103 that is intended for insertion into a canal 202 of the human ear 200 so as to deliver sound from the passage for sound transmission into the human ear 200. The body portion 102 is so designed as to fit in a cavum concha area 220 (also referred to as "lower concha") of the human ear 200, where the cymba concha area 210 and the cavum concha area 220 are collectively referred to as a concha 220 in the context of this disclosure. Since the tail portion 101 and the body portion 102 respectively fit in the cymba concha area 210 and the cavum concha area 220 of the human ear 200, the surface friction generated therefrom combined with specific pressure that forces the body portion 102 toward the canal 202 and cavum concha area 220 achieve the desired stability of the earpiece.

Indicative from the relative position of the body portion 102 to the tip portion 103 and a bent direction of the tail portion 101, the stabilizer 100 as shown in FIG. 1 is in an earpiece for a left ear, and cannot be used in an earpiece for a right ear, because the geometry thereof precludes such possibility in consideration into the nature of human ear anatomy. With this configuration, in order for a pair of earpieces for a left ear and a right ear, the earpieces for the left and right ears are mirror-symmetric with each other but they are not identical. Due to this fact, the manufacture cost and complexity, such as design process, development man-hour, tooling, equipment and complex delivery control, are high. From the perspective of a user, the user has to identify whether an earpiece is for left ear or right ear before wearing it, which is relatively time-consuming and complex and is suboptimal in some emergency scenarios.

In view of the above disadvantages of related art, a device for transmitting sound to an ear canal and an earpiece including the same are provided according to the present disclosure, which are described hereinafter in detail in conjunction with the appended drawings. It is noted herein that the term "earpiece" in this disclosure substantially bears the same meaning with "earphone" and "earbud", which refers to the part of an instrument (such as a telephone, stethoscope, or hearing aid) that is placed against or inserted into an outer opening of an ear.

Combined reference is made to FIGS. 3*a* and 3*b*, which respectively show a front view and a side view of a device 1000 for transmitting sound to an ear canal according to an embodiment in an aspect of the present disclosure. As shown in FIGS. 3*a* and 3*b*, the device 1000 for transmitting sound to an ear canal includes a stabilizer element 1100 and a body portion 1200.

The body portion 1200 has a first surface 1201 for contact with a cavum concha area 220 of a human ear 200 as shown in FIG. 2 and a second surface 1202 for coupling with a sound generator, where a sound passage 1300 connecting the first surface 1201 and the second surface 1202 is formed in the body portion 1200. The sound passage 1300 allows sound from the sound generator to arrive at the ear canal, and the sound generator may be any circuit configuration including a transducer that is capable of turning electric energy into sound, for example, the sound generator may be or include a speaker suitable for an earpiece, which is not limited in this disclosure.

The stabilizer element 1100 extends from the body portion 1200 and is bendable in both a clockwise direction and a counterclockwise direction with respect to a central axis 1301 of the sound passage 1300 for contact with a cymba concha area 210 of the ear 200 to stabilize the device 1000 to the ear 200. The clockwise direction and the counterclockwise direction may be defined with reference to the curl right hand rule in the present disclosure, in which the thumb points at a direction from the first surface 1201 to the second surface 1202 and the other fingers curl in the counterclockwise direction; accordingly, a direction opposite to the indicated counterclockwise direction is the clockwise direction. In other words, the clockwise direction and the counterclockwise direction are defined by looking from the second surface 1202 to the first surface 1201.

The stabilizer element 1100 may be made of a flexible material and has a harness lower than that of the body portion 1200, so that the stabilizer element 1100 is bendable in both directions and when the stabilizer element 1100 is in a bent state, the body portion 1200 can maintain the shape of the sound passage 1300.

FIG. 4 shows a schematic diagram of the device in FIG. 3*a* in a bent state. In FIG. 4, the stabilizer element 1100 is bent in the counterclockwise direction, in which case an earpiece including the device 1000 is wearable on a left ear. Understandably, the stabilizer element 1100 may also be bent in the clockwise direction, in which case the earpiece including the device 1000 is wearable on a right ear. That is, a user can wear the earpiece including the device 1000 on his left ear or right ear by bending the stabilizer element 1100 in the counterclockwise direction or the clockwise direction, respectively. It is noted the device 1000 bent in the clockwise direction is not separately illustrated herein for it can be sufficiently clear from the above description with reference to the above FIG. 4.

In the device for transmitting sound to an ear canal according to the embodiment of the present disclosure, the stabilizer element 1100 is bendable in both a clockwise direction and a counterclockwise direction with respect to the central axis 1301 of the sound passage 1300, so that the body portion 1200 can fit in a cavum concha area 220 when the earpiece is worn on any of the left ear and right ear of a human. That is, earpieces for left ear and right ear can be formed to have the same configuration. In this way, the manufacture cost and complexity can be reduced, and a user does not have to identify whether an earpiece is for left ear or right ear before wearing it, thereby reducing difficulty and confusion and improving user experience for the user.

In an embodiment based on the above embodiment, a device 1000 for transmitting sound to an ear canal is provided. In this embodiment, the stabilizer element 1100 may be preferably formed to be symmetric about a major axis 1400 of the device, as shown in FIG. 5. A length of the device 1000 in an extending direction of the major axis 1400 may be longer than a length in an extending direction of any other axis of the device 1000. The major axis 1400 may extend such that it crosses the central axis 1301 of the sound passage 1300 to form an included angle with the central axis 1301. In this disclosure, this included angle between the major axis 1400 and the central axis 1301 is not limited, which may be 90 degrees preferably.

By the above symmetric formation of the stabilizer element 1100, the compatibility of the device 1000 with both left ear and right ear is improved, which further reduces complexity of use and improves user experience for a user.

In an embodiment based on the above embodiments, a device 1000 for transmitting sound to an ear canal is provided. In this embodiment, in order to further improve the ease of use for the user, an aperture 1500 (also referred to as "opening") may be provided in the stabilizer element 1100, as shown in FIG. 6*a*. In other words, the stabilizer element 1100 is hallowed out. The aperture 1500 may be symmetric about the major axis 1400 of the device 1000. A shape of the aperture 1500 is not limited in the present disclosure, where the aperture 1500 may be parallelogram-shaped, as shown in FIG. 6*a*, or kite-shaped, as shown in the following FIG. 7. It should be noted that in the present disclosure, the shape of the aperture 1500 may be defined by a cross section of the aperture 1500 by looking from the second surface 1202 to the first surface 1201 or the other way around. That is, the shape is as illustrated in schematic side views of the device 1000 in this disclosure.

In this context, the stabilizer element 1100 may be considered as including a first leg 1101 and a second leg 1102 respectively at the left side and right side of the aperture 1500 and the major axis 1400 since the aperture 1500 is symmetric about the major axis 1400. When the stabilizer element 1100 is bent along the counterclockwise direction, the first leg 1101 is compressed, and the second leg 1102 is stretched or expanded, as illustrated in FIG. 6*b* which shows the stabilizer element 1100 of the device 1000 is bent along the counterclockwise direction. Accordingly, when the stabilizer element 1100 is bent along the clockwise direction, the first leg 1101 is stretched or expanded, and the second leg 1102 is compressed, which is not shown in the drawings for brevity purposes.

By providing the aperture 1500 in the stabilizer element 1100, resistance when the user wants to bend the stabilizer element 1100 in order to wear an earpiece is reduced, and the bent stabilizer element 1100 can better fit the geometry of a human ear as more space for bending is provided. In this way, ease of use and user experience are improved for the user.

In addition to the above shapes of parallelogram and kite, other shapes may be configured for the aperture 1500. In an embodiment, the aperture 1500 may be semielliptical, as shown in FIG. 8*a*. Further, in an embodiment, the outline of the stabilizer element 1100 may be parallel or substantially parallel to the semielliptical aperture 1500, so that the stabilizer element 1100 is formed to be a semielliptical loop. By this configuration, the edge of the stabilizer element 1100 can be smoother so as to improve wearing comfort for the user when the user is wearing the earpiece.

In an embodiment based on the above embodiments, a device 1000 for transmitting sound to an ear canal is provided. In this embodiment, the stabilizer element 1100 includes a first side surface 1103 and a second side surface 1104 as shown in FIG. 9*a*. As can be seen from FIG. 9*a* and with reference to FIG. 2, when the stabilizer element 1100 is bent along the clockwise direction, the first side surface 1103 is in contact with a cymba concha area of a right human ear, and when the stabilizer element 1100 is bent along the counterclockwise direction, the second side surface 1104 is in contact with a cymba concha area of a left human ear, so as to fix an earpiece including the device 1000 to a corresponding ear. In order to allow for more space for the user to bend the stabilizer element 1100 with less force, a first recess 11031 and a second recess 11041 may be respectively provided on the first side surface 1103 and the second side surface 1104.

The first recess 11031 and the second recess 11041 may be symmetric with each other about a central axis of the stabilizer element 1100, and in some embodiments, the central axis of the stabilizer element 1100 may coincide with a part of the major axis 1400 of the device 1000. That is, the first recess 11031 and the second recess 11041 may be symmetric with each other about the major axis 1400 of the device 1000.

As can be seen from FIG. 9*a*, a width of each of the first recess 11031 and the second recess 11041 may gradually decrease along a direction from the first side surface 1103 or the second side surface 1104 to the central axis of the stabilizer element 1100 (or to the major axis 1400 of the device 1000 in some embodiments). It is herein noted that the widths of the first recess 11031 and the second recess 11041 may be defined along a direction parallel to the first side surface 1103 and the second side surface 1104, respectively, or along a direction parallel to the central axis of the stabilizer element 1100 or the major axis 1400 of the device 1000, though the present disclosure is not limited thereto.

In FIG. 9*a*, cross sections of the first recess 11031 or the second recess 11041 are triangular, while in other embodiments, the cross sections above may have other shapes that conform to the width requirements as described above. For example, in an embodiment, a cross section of each of the first recess 11031 or the second recess 11041 may be semielliptical, as shown in FIG. 9*b*. The triangular and semielliptical cross sections are merely examples for purpose of clearer description and do not limit the present disclosure thereto. Accordingly, a recess having a cross section of any other shape that conforms to the width requirements shall fall within the scope of the present disclosure.

In an embodiment based on the above embodiments, a device 1000 for transmitting sound to an ear canal is provided. In this embodiment, the stabilizer element 1100 may be made of a resilient or flexible material, so that the stabilizer element 1100 can restore to its initial shape where the stabilizer element 1100 is symmetric about the major axis 1400 of the device 1000, after a user takes off an earpiece including the device 1000 for transmitting sound to an ear canal. In order to improve the wearing comfort of a user, the resilient material may preferably be a soft material with resilience, that is, a resilient soft material. In addition, the use of soft material enables the stabilizer element 1100 to fit ears with different sizes. Examples of the soft material may be selected, but not limited to, from a group including elastomer, epoxy, urethane (or polyurethane) and silicone, while the present disclosure is not limited to the material as listed and other materials suitable for the purpose of the present disclosure may also be used.

The stabilizer element 1100 may also be made a combination of different materials. In an embodiment based on the above embodiments, the stabilizer element 1100 may include a top portion 1105 and a bottom portion 1106, and the top portion 1105 may be coupled or connected with the body portion 1200 by the bottom portion 1106, as is shown in FIG. 10. That is, the bottom portion 1106 is formed between the top portion 1105 and the body portion 1200. The top portion 1105 may be made of a first material, and the bottom portion 1106 may be made of a second material, where the first material is different from the second material. For example, a hardness of the second material may be different from a hardness of the first material. That is, the hardness of the second material may be higher than or lower than the hardness of the first material. Since the top portion 1105 directly contacts with a cymba concha area of a human ear, it is preferable that the top portion 1105 be made of a soft material, such as silicone, air-filled injection molded materials or sponge-like materials.

The device for transmitting sound to an ear canal according to the present disclosure is described in detail above. It is further noted that the above-described device 1000 for transmitting sound to an ear canal may be applied to various kinds of hearing-related devices, such as earphone, earbud, earplug, hearing aid, earpiece and so on.

An earpiece 2000 is further provided according to an embodiment in another aspect of the present disclosure. As shown in FIG. 11, the earpiece 2000 includes the device 1000 for transmitting sound to an ear canal according to any one of the embodiments and a sound generator 3000. The sound generator 3000 is coupled with the body portion 1200 at the second surface 1202, and is configured to generate sound and transmit the sound to the ear canal through the sound passage 1300.

The sound generator 3000 may be any circuit configuration including a transducer that is capable of turning electric energy into sound, for example, the sound generator may be a speaker suitable for an earpiece, which is not limited in this disclosure. The sound generator 3000 may be coupled with the device 1000 for transmitting sound to an ear canal by any suitable means in the art, such as snap-fit or a connector.

The earpiece 2000 may further include a drive circuit that is configured to generate a drive signal, and the sound generator 3000 generates sound in response to the drive signal. The earpiece 2000 may further include a processor that controls the operation of the drive circuit by sending instructions to the drive circuit, which is not further elaborated herein.

The embodiments of the present disclosure are described in a progressive manner, where each embodiment emphasizes difference from the other embodiments. Reference may be made to each other of the embodiments for similar or related parts. Technical features in different embodiments may be combined with each other as long as they do not conflict with each other. Any modifications, equivalents or refinements made in accordance with the idea and concept disclosed herein shall also fall within the scope of the disclosure.

What is claimed is:

1. A device for transmitting sound to an ear canal, the device comprising:

a body portion, the body portion including a first surface for contact with a cavum concha area of an ear and a second surface for coupling with a sound generator, wherein a sound passage connecting the first surface and the second surface is formed in the body portion; and a stabilizer element extending from the body portion, the stabilizer element being bendable in both a clockwise direction and a counterclockwise direction with respect to a central axis of the sound passage for contact with a cymba concha area of the ear to stabilize the device to the ear, wherein both of a first side surface and a second side surface of the stabilizer element include a recess and a width of the recess gradually decreases along a direction from the first side surface or the second side surface to a central axis of the stabilizer element, and wherein the first side surface and the second side surface are for contact with the cymba concha area of the ear when the stabilizer element is bent along the clockwise direction and the counterclockwise direction, respectively.

2. The device according to claim 1, wherein the stabilizer element is symmetric about a major axis of the device, the major axis extending to cross the central axis of the sound passage.

3. The device according to claim 1, wherein an aperture is formed in the stabilizer element.

4. The device according to claim 3, wherein the aperture is symmetric about a major axis of the device.

5. The device according to claim 3, wherein the aperture is parallelogram-shaped or kite-shaped.

6. The device according to claim 3, wherein the aperture is semielliptical.

7. The device according to claim 6, wherein the stabilizer element is a semielliptical loop.

8. The device according to claim 1, wherein a cross section of the recess is triangular or semielliptical.

9. The device according to claim 1, wherein the stabilizer element is made of a soft material.

10. The device according to claim 9, wherein the soft material is selected from elastomer, epoxy, urethane, or silicone.

11. The device according to claim 1, wherein the stabilizer element comprises a top portion made of a first material and a bottom portion made of a second material and the top portion is coupled with the body portion by the bottom portion.

12. The device according to claim 11, wherein a hardness of the second material is different from a hardness of the first material.

13. An earpiece comprising:

the device for transmitting sound to an ear canal according to claim 1; and a sound generator, coupled with the body portion at the second surface and configured to generate sound and transmit the sound to the ear canal through the sound passage.

14. A device for transmitting sound to an ear canal, the device comprising:

a body portion, the body portion including a first surface for contact with a cavum concha area of an ear and a second surface for coupling with a sound generator, wherein a sound passage connecting the first surface and the second surface is formed in the body portion; and a stabilizer element extending from the body portion, the stabilizer element being bendable in both a clockwise direction and a counterclockwise direction with respect to a central axis of the sound passage for contact with a cymba concha area of the ear to stabilize the device to the ear, wherein an aperture is formed in the stabilizer element, wherein both of a first side surface and a second side surface of the stabilizer element include a recess and a width of the recess gradually decreases along a direction from the first side surface or the second side surface to a major axis of the device, and wherein the first side surface and the second side surface are for contact with the cymba concha area of the ear when the stabilizer element is bent along the clockwise direction and the counterclockwise direction, respectively.

* * * * *